United States Patent [19]
Provi et al.

[11] 4,023,634
[45] May 17, 1977

[54] PLATFORM TYPE WEIGHING SCALE

[75] Inventors: Mike A. Provi; S. Robert Guinter, both of Rockford, Ill.

[73] Assignee: The Brearley Company, Rockford, Ill.

[22] Filed: Nov. 12, 1975

[21] Appl. No.: 631,330

[52] U.S. Cl. .............................. 177/211; 73/141 A; 177/DIG. 9; 308/2 A
[51] Int. Cl.² ...................... G01G 21/02; G01G 3/14
[58] Field of Search ............ 177/211, DIG. 9, 151; 73/141 A; 308/2 R, 2 A

[56] References Cited
UNITED STATES PATENTS

| | | | |
|---|---|---|---|
| 2,736,549 | 2/1956 | Paul | 177/DIG. 9 X |
| 2,899,191 | 8/1959 | Hunt | 177/211 X |
| 3,938,603 | 2/1976 | Shoberg | 177/211 |

*Primary Examiner*—Joseph W. Hartary
*Attorney, Agent, or Firm*—Morsbach & Pillote

[57] ABSTRACT

A platform type weighing scale including a base, a scale platform, and a unitary weigh frame having spaced parallel torque members and an elongated bendable load sensing beam extending between and ridgidly attached to the torque members. Four frame suspensions engage the torque members to support the weigh frame on the base and four platform suspensions engage the torque members to support the platform on the weigh frame and apply forces to the first and second torque members correlative with the load on the platform and to produce a bending moment in the beam correlative with the sum of the forces applied to the first and second torque members. Electrical transducer means senses bending of the sensing beam as an indication of the weight applied to the scale platform.

8 Claims, 8 Drawing Figures

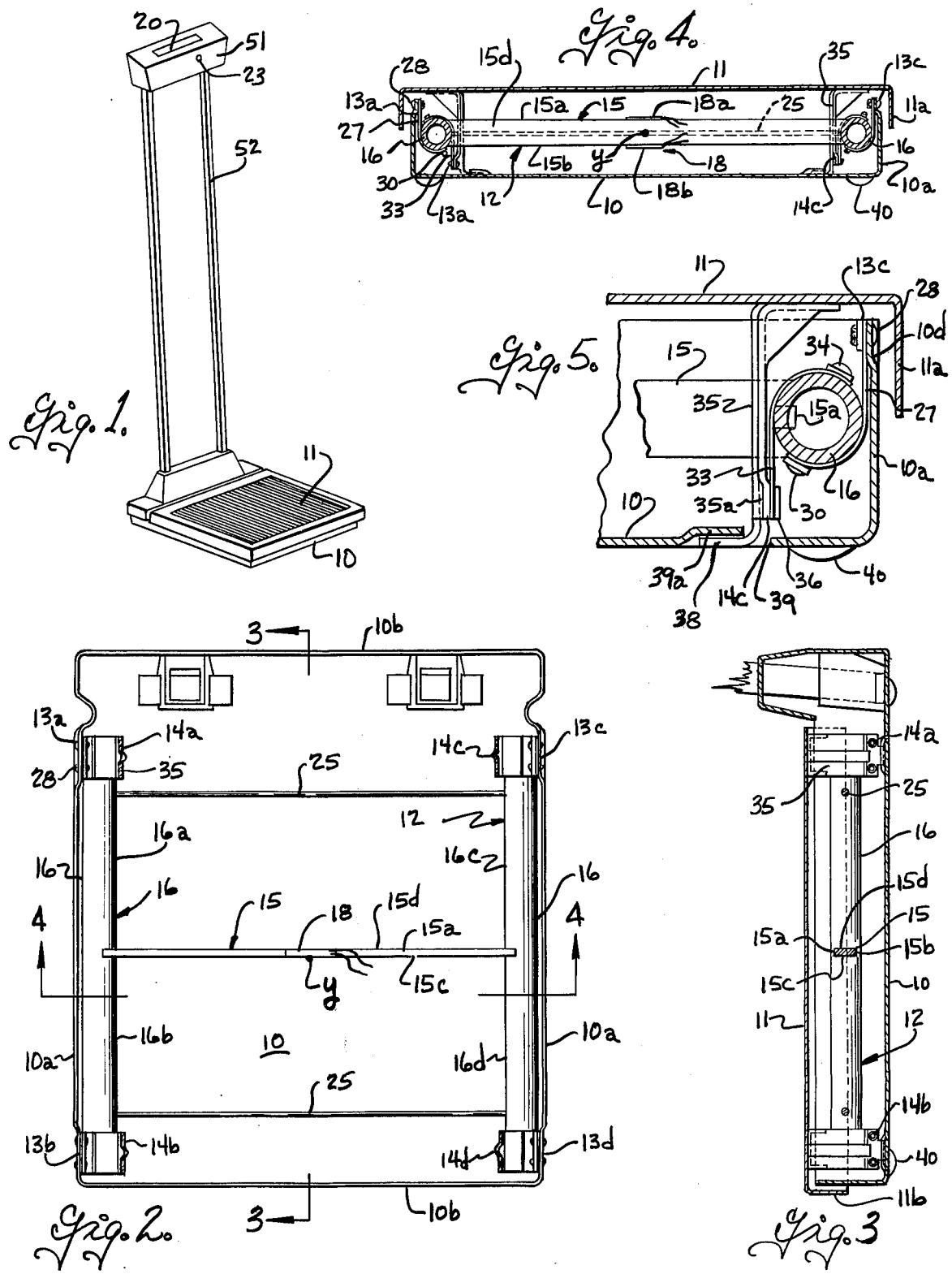

PLATFORM TYPE WEIGHING SCALE

BACKGROUND OF THE INVENTION

Platform type weighing scales are commonly subject to nonuniform loading on the scale platform. It is difficult to provide a single platform support for a relative large scale platform that is capable of withstanding substantial nonuniform loading, and it has heretofore been proposed to make platform scales with four platform suspensions, with various different mechanisms for summing the loads applied to all four suspensions and for actuating a weight display. Some platform scales, for example as shown in U.S. Pat. No. 2,736,549, had two torque tubes extending between and interconnecting first and second pairs of the four platform suspensions and utilized two transfer levers connected through pivots to a weight indicating device. Some other platform scales, for example as shown in the U.S. Pat. No. 3,465,838, utilized four levers to transmit the loads on the four platform suspensions to a common load cell. However, the aforementioned platform scales utilizing two transfer levers or four transfer levers require substantial additional apparatus for mounting the weight indicating mechanism on the base and for applying forces from the several levers to the weight mechanism in order to actuate the later in accordance with the sum of the forces on the several levers.

It has also been proposed, for example as shown in U.S. Pat. No. 3,258,078 to provide load sensing devices such as strain gauges in each of the four platform suspensions and to electrically sum the signals from the four strain gauges on the four platform suspensions. However, even small differences in either the rate or linearity of response of the four strain gauges could cause variations in the indicated weight with different distribution of the load or weight on a scale platform. It is therefore necessary to carefully select and match the four strain gauges used in such scale for both linearity and rate of response in order to make a scale of this type which is relatively insensitive to nonuniform loading.

SUMMARY OF THE INVENTION

It is the general object of the present invention to overcome the disadvantages of the prior art by providing a platform type weighing scale using four platform suspensions and having an improved arrangement for summing the loads applied to the four platform suspensions and which utilizes a minimum of moving parts.

Another object of this invention is to provide a platform type weighing scale using four platform suspensions and which has a unitary weigh frame for summing the loads applied to the four platform suspensions.

Still another object of this invention is to provide a platform type weighing scale in accordance with the foregoing object in which a bendable load sensing beam is rigidly connected to a pair of rigid torque applying members to form a unitary weigh frame and in which the weigh frame is suspended from the base and connected to the platform in a manner to apply a bending moment to the load sensing beam correlative with the sum of the loads applied to the four platform suspensions, while avoiding end loading of the beam.

Still another object of this invention is to provide a platform type weighing scale that can be economically and reliably mass-produced.

Accordingly, the present invention provides a platform type weighing scale including a base and a scale platform, a unitary weigh frame having an elongated bendable load sensing beam and a pair of rigid members rigidly attached to opposite ends of the sensing beam and each defining a pair of arm portions extending laterally from opposite sides of the load sensing beam, with four frame suspensions mounted on the base and engaging a respective one of the arm portions for supporting the weigh frame on the base and four platform suspensions mounted on the platform and each engaging a respective one of the arm portions for supporting the platform on the weigh frame, the platform suspensions and the frame suspensions respectively defining platform and frame pivot supports offset from each other in a direction generally paralleling the length of the sensing beam to apply a bending moment to the sensing beam correlative with the sum of the loads applied to the scale platform at the four platform suspensions, and transducer means for sensing the bending of the sensing beam as an indication of the weight applied to the scale platform. The electrical transducer means preferably comprises a strain gauge or gauges mounted on the sensing beam at a location to sense the sum of the bending moments in the beam. The base and platform suspensions are preferably in the form of flexible elements to suspend the weigh frame on the base and to suspend the platform on the weigh frame in such a manner as to avoid end loading of the sensing beam.

These, together with other obvious features and advantages of the invention will be more readily understood by reference to the following detailed description, when taken in connection with the accompanying drawings wherein:

FIG. 1 is a perspective view of the platform scale embodying the present invention;

FIG. 2 is a plan view of the platform scale with the scale platform removed;

FIG. 3 is a longitudinal vertical sectional view through the platform scale taken on the plane 3—3 of FIG. 2;

FIG. 4 is a transverse vertical sectional view through the platform scale taken on the plane 4—4 of FIG. 2;

FIG. 5 is an enlarged transverse vertical sectional view through the platform scale;

Figure 8:
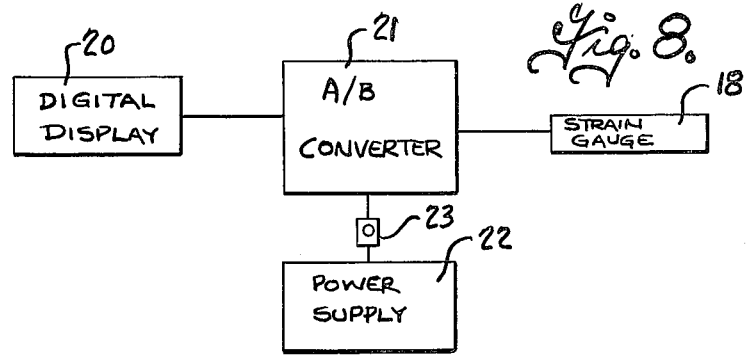
FIG. 8 is a schematic electrical diagram for the platform type weigh scale.

The scale in general includes a relatively rigid base 10, a scale platform 11, a unitary weigh frame 12 which is mounted by four frame suspensions 13a–13d on the base, and four platform suspensions 14a–14d for supporting the platform on the weigh frame. The weigh frame 12 includes an elongated bendable load sensing beam 15 that is rigidly attached at opposite ends to rigid members 16 that define pairs of arm portions 16a, 16b and 16c, 16d extending laterally from the sensing beam 15 adjacent opposite ends. The load sensing beam 15 is subjected to bending moments correlative with the sum of the loads applied to the four platform suspensions 14a–14d and electrical transducer means 18 are provided for sensing the sum of forces applied to the sensing beam 15. The electrical transducer means is utilized to operate a visual display 20 through a signal converter 21 powered by power supply 22 (FIG. 8).

The base 10 is conveniently in the form of a relatively flat tray having upstanding side and end walls 10a and 10b and the tray base may be provided with embossing or ribs (not shown) to further stiffen and rigidify the same in the manner well understood in the art. The scale platform 11 is also conveniently formed with depending side and end walls 11a and 11b to rigidify the platform.

The pairs of arms 16a, 16b and 16c, 16d constitute opposite end portions of elongated torque members 16, herein shown in the form of torque tubes. The beam 15 is rigidly secured intermediate the ends of the torque tubes 16 by any suitable fastening means and may, for example, be secured by welding, and tenons 15a (FIG. 5) are preferably provided on the ends of the beams to extend into openings in the torque tubes to not only aid in locating and positioning the beam on the torque tubes during welding, but to also form a key to aid in nonrotatably securing the torque tubes to the ends of the beam. The load sensing beam 15 and rigid torque members 16 form a unitary generally H-shaped frame. The sensing beam is preferably located medially between the ends of the torque members 16 but it is to be understood that it could be located adjacent one end of the torque members, if desired. In order to inhibit application of stresses to the bending beam 15 in a plane transverse to the desired plane of bending of the beam, a means may be provided for holding the torque tubes in parallel relation. In the embodiments shown, this means comprises flexible ties 25, conveniently in the form of flexible cables or wires, secured to the torque tubes at locations spaced from the beam 15. The ties 25 are terminally secured to the torque tubes as by welding or the like and form tension members that extend between the torque tubes to inhibit movement of the torque tubes out of parallelism. Since the ties 25 need only operate in tension they can be made of relatively small cross-section as compared to the cross-section of the bending beam and highly flexible in a plane paralleling the desired plane of bending of the beam 15. Thus, the ties 25 do not interfere with transmission of load forces by the torque members 16 from the platform suspensions to the sensing beam 15.

The frame suspensions 13a – 13d are of the flexible type to pivotally support the frame 12 on the base. As best shown in FIG. 5 the frame suspensions each comprise a flexible band 27 which is attached to its upper end as by fasteners 28 to the side wall 10a of the base and which extends downwardly and part way around the respective arm portion with its lower end secured to the arm portion as by fasteners 30. The flexible bands 27 are preferably laterally offset from the side walls 10a and, for this purpose, the side walls are formed with an offset portion 10d at the point of attachment of the bands thereto. Thus, the frame is free to shift horizontally a limited distance without contacting the side walls 10a of the base, to avoid applying loads in a direction lengthwise of the beam 15 as may occur if the frame 12 contacts the side walls 10a. The platform suspension 14a–14d for suspending the scale platform on the frame are also of the flexible type and, as shown, comprise flexible bands 33 which are attached at one end as by fasteners 34 to the respective arm portion on the frame and which extend part way around the arm portion and downwardly tangent to the arm portion. The scale platform 11 is formed with brackets 35 that extend downwardly from the platform and which are attached at their lower ends as by fasteners 36 to the lower ends of a respective one of the flexible bands 33. The brackets 35 are also preferably formed so as to be laterally spaced from the bands 33 and the respective arm portion of the frame, and as shown, the arms have offset portions 35a at the lower ends at the point of attachment of the bands 33 thereto to space the bands from the brackets. In order to inhibit detachment of the scale platform from the base, the brackets 35 are conveniently formed with stops 38 at their lower ends that extend through openings 39 in the base and which are adapted to underlie and engage stop members 39a conveniently formed on the base. As is conventional, the base is formed with depending legs 40, conveniently in the form of depressions formed in the base, to space the base above the floor or other supporting surface.

The frame suspension 13a–13d thus pivotally support the frame 12 on the base 10 at the point of tangency of the bands 27 to the respective arm portion of the weigh frame and the platform suspensions 14a – 14d similarly pivotally support the platform on the weigh frame, at the point of tangency of the bands 33 to the respective arm portion of the weigh frame. The pivot supports of the platform on the weigh frame are thus horizontally offset from the pivot supports of the weigh frame on the base in a direction generally paralleling the length of the sensing beam 15 and forces applied by a load on the scale platform to the platform suspensions 14a and 14b are transmitted to the arm portions 16a and 16b of one torque tube 16 to one end of the beam 15 and, similarly, forces applied to the other pair of platform suspensions 14c, 14d are transmitted through the arm portions 16c and 16d of the other torque tube to the other end of the beam 15. Thus, the arm portions 16a and 16b apply a first force couple to the bending beam in a vertical plane, which force is correlative with the sum of the loads applied to the platform suspensions 14a and 14b. Arm portions 16c and 16d similarly apply a second force couple to the other end of the beam 15 in a vertical plane, and which second force couple is correlative with the sum of the loads applied to the platform suspension 14c and 14d. The platform suspensions 14a – 14d are each offset horizontally inwardly in a direction paralleling the length of the beam 15 from the respective frame suspension 13a – 13d so that the bending moments produced in the beam 15 by the force couples applied to opposite ends of the beam produce additive effects. In other words, the total bending moment in the beam 15 is correlative with the sum of the bending moments applied to opposite ends of the beam and is therefore correlative with the total load applied to the platform through the four platform suspensions. For any given total load on the scale platform 11, the sum of the forces applied to the beam 15 by pairs of arms 16a, 16b and 16c, 16d will be indpendent of the load distribution on the scale platform, but the relative amplitude of the forces applied to opposite ends of the beam will vary depending on the distribution on the load on the platform. The sum of the bending moments produced by the forces acting on the relatively opposite ends of the beam 15 will remain substantially constant at the point Y that is medially between the ends of the beam, notwithstanding changes in the distribution of the load applied to the pairs of platform suspensions 14a, 14b and 14c, 14d.

The sum of the bending moments in the beam 15 produced by the forces acting at opposite ends of the beam is sensed by the electrical transducer means 18. The stress moment at any cross-section of a beam is equal to the bending moment at the location of that cross-section along the beam. The electrical transducer means is advantageously of the electrical strain gauge type and is mounted on the sensing beam 15 to sense the longitudinal strains in that beam produced by the sum of the bending moments in the beam. The electrical strain gauge may, for example, be a wire type strain gauge utilizing strain sensitive wire or a piezoresistive type strain gauge. The strain gauge sensors are mounted symmetrically with respect to the point $Y$ on the beam, that is symmetrically with respect to a point medially between the ends of the beam, and the strain gauge is mounted to sense the longitudinal strain produced in the beam as it is deflected in the plane of action (vertical plane) of the forces applied to the beam by the torque members attached to opposite ends of the beam. A single strain gauge can be utilized at the edge or side of the beam at a location offset from the neutral plane of the beam to sense either the tensile or compressive strains in the beam. However, in order to increase the output of the transducer, a pair of strain gauges designated as $18a$ and $18b$ are preferably mounted at relative opposite edges of the beam or on a side of the beam adjacent the edges. Since one edge of the beam is in tension and the other in compression, the resistances of the strain gauges $18a$ and $18b$ will vary relatively opposite in magnitude in response to bending of the beam. In order to make the resistances of the two strain gauges vary substantially equal amounts in opposite directions in response to the bending moment in the beam, the gauges are mounted on the edges of the beam that are spaced equal distances from the neutral surfaces on the beam, that is the longitudinal section of the beam where there is no change in the length of the fibers and no tensile or compressive forces acting on them. The beam 15 is conveniently a simple beam of generally rectangular cross-section and, in such a simple beam, the neutral surface is medially between the opposite edges $15a$ and $15b$ of the beam. As is well understood in the art, the strain gauges are affixed to the edges of the beam by suitable adhesive or cement. The output of the strain gauge is enhanced by increasing the length of the strain gauges in a direction paralleling the strains being measured and, as shown in FIGS. 2 and 4, the strain gauges are elongated in the direction lengthwise of the beam and are mounted on the beam in a manner to be longitudinally symmetrical with respect to the midpoint $Y$ of the beam.

The output of the strain gauges is utilized to actuate the visual display 20. The visual display can take various forms and may, for example, include an electrical meter responsive to the change in the resistance of the strain gauges produced by the load forces applied to the beam and calibrated to indicate the weight applied to the platform. In the embodiment illustrated, the strain gauges are arranged to actuate a digital type visual display 20 and, as schematically shown in FIG. 8, the strain gauges are connected to an analog-to-digital converter 21 that is powered from a power supply 22 and which is operative to actuate the digital display. As shown in FIG. 1, the digital display 20 is conveniently mounted in a casing 51 which is supported in an elevated position as by posts 52 so that it can be conveniently read by the user of the scale. In order to conserve power, the application of power from the power supply 22 to the converter is convieniently in the control of switch 23 which can be manually operated whenever it is desired to read the weight applied to the scale platform.

Figure 6:
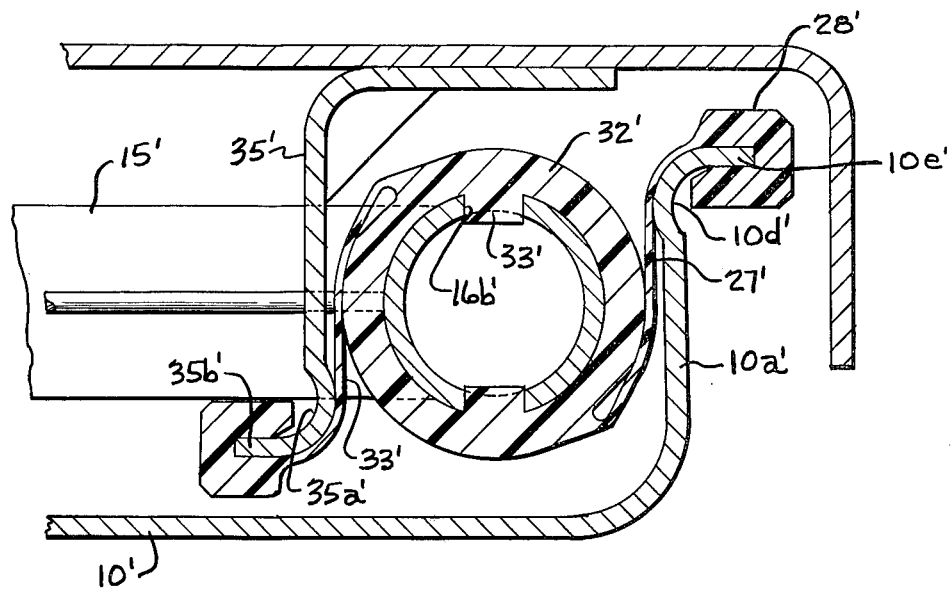
FIG. 6 is a transverse vertical sectional view through a platform scale having a modified form of platform suspension.
Figure 7:
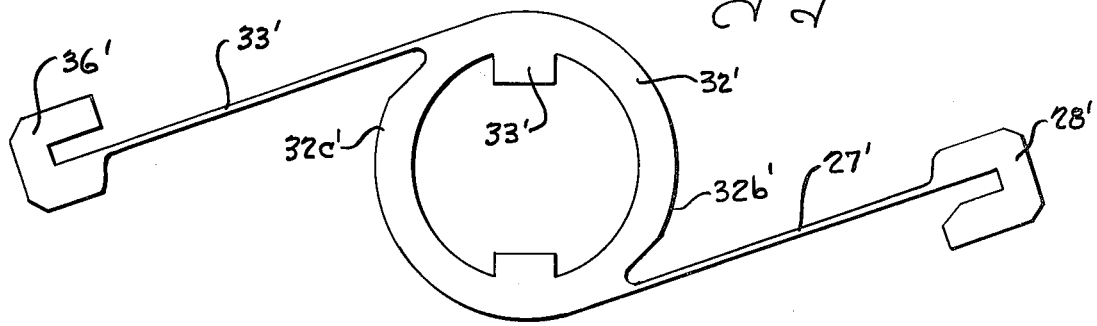
FIG. 7 is an expanded view of the platform suspension used in the scale of FIG. 6.

A modified form of frame suspension and platform suspension is illustrated in FIGS. 6 and 7 and like numerals followed by the postscript ' are utilized to designate corresponding parts. In this embodiment, a hub $32'$ is nonrotatably attached as by keys $32'$ that extend into slots $16b'$ in the ends of the respective arm portions. The platform suspensions are in the form of flexible bands $27'$ having one end formed integrally with the hub member $32'$ and having a relatively rigid hook portion $28'$ shaped to engage a flange $10e'$ on the upper edge of the side wall $10a'$ on the base $10'$. The side wall $10a'$ is also preferably formed with a depression $10d'$ to offset the band $27'$ from the side wall. The platform suspensions comprise a flexible band $33'$ having one end formed integrally with the hub $32'$ at a location angularly spaced from the point of connection of the band $27'$, and which band $33'$ has a relatively rigid hook portion $36'$ for engaging a flange $35b'$ on the lower end of the platform on the bracket $35'$. The bracket $35'$ is also formed with an offset portion $35a'$ to offset the band $33'$ from the bracket. The hub $32'$ and bands $27''$, $33''$ are conveniently formed of a flexible plastic material and may, for example, be formed of nylon, polyacetal, or the like. The plastic material in the bands can be reinforced with fibers or strands if desired to increase its strength. The hub and bands are preferably molded in an expanded position as shown in FIG. 7, with the bands $27'$ and $33'$ extending generally tangent to the hub $32'$ at the point of connection thereto, and the hub is formed with arcuate surfaces $32b'$ and $32c'$ which are concentric with the hub axis and which engage the bands $27'$ and $33'$ respectively when assembled on the scale. The bands, when assembled on the scale as shown on FIG. 6, extend generally tangent to the surfaces $33b'$ and $32c'$ and thus define pivot supports for the frame 12.

From the foregoing it is thought that the construction and operation of the scale will be readily understood. The weight applied to the scale platform 11 is transmitted to the four platform suspensions $14a - 14d$ and the load applied to each of the suspensions will vary somewhat dependent on the load distribution on the scale platform. The pairs of arm portion $16a$, $16b$ and $16c$, $16d$ respectively interconnect the pairs of platform suspensions $14a$, $14b$, and $14c$, $14d$ and effectively sum the loads applied to the respective pairs of platform suspensions. The pairs of arm portions $16a$, $16b$, and $16c$,$16d$ in turn apply forces to relatively opposite ends of the bendable load sensing beam 15, correlative with the sum of the loads applied to the respective pair of platform suspensions. The sensing beam is subjected to bending moments correlative with the forces applied by the pairs of arm portions to produce a total bending moment in the beam correlative with the sum of the bending moments produced by the forces applied to opposite ends of the beam. The electrical strain gauges $18a$ and $18b$ are mounted on the beam to sense the sum of the bending moments produced in the beam by the forces applied to opposite ends of the beam and are located medially between the ends of the beam. Changes in load distribution on the scale platform do produce relative changes in amplitude of the forces applied to the opposite ends of the beam. However, the algebraic sum of the forces applied to opposite ends of the beam will remain substantially constant for any given total load on the scale platform. As previously described, the sum of the bending moments produced at a location $Y$ medially between the ends of the beam will be substantially the same for any given load on the scale platform, notwithstanding variations in the load distribution on the scale platform. The cross-sectional dimensions and hence the stiffness of the beam is selected in accordance with the transducer characteristics and the load range for which the scale is to be used, to produce an output from the electrical transducer in a range sufficient to reliably operate the visual display 20 through the converter 26. Since the sensing beam 15 is rigidly connected to the arm portion $16a - 16d$ to form a unitary weigh frame, the scale utilizes a minimum of moving parts and therefore avoids the wear and friction due to pivots and fulcrums customarily used to connect the load transfer arms to the weight indicating mechanism. In addition, since the weigh frame is supported by flexible pivots and the platform is in turn supported on the weigh frame by flexible pivots, end loading of the sensing beam 15 is effectively avoided. The flexible ties 25 are preferably used between the spaced torque members to maintain the same parallel relation. The ties 25 are highly flexible in a plane paralleling the desired plane of bending of the beam 15 and do not interfere with transmission of load forces by the torque members 16 from the platform suspensions to the sensing beam, but the ties are effective to inhibit bending of the beam in a direction perpendicular to the desired plane of bending of the beam, that is the vertical plane of action of the forces applied to the beam by the torque members. The strain gauges 18a and 18b are mounted on beam to sense the strains in the beam caused by bending in the desired plane of bending and the strain gauges are preferably centered between the opposite side faces $15c$ and $15d$ of the beam to enhance the immunity of the strain gauges to strains which would be caused by bending of the beam in a direction crosswise of the desired plane of bending of the beam.

The embodiments of the invention in which an exclusive property or privilege is claimed are defined as follows:

1. In a platform type weighing scale including a base and a scale platform, first and second rigid torque members disposed between the base and platform, first and second pairs of hub members respectively nonrotatably attached to the ends of the first and second torque members, the hub members each having a flexible base suspension member and a flexible platform suspension member formed integrally therewith at spaced locations therearound, means attaching the free ends of said flexible base suspension members to said base to pivotally suspend the torque members from the base and means for attaching the free ends of said flexible platform suspension members to said platform to suspend the platform from the torque members and apply turning moments to the first and second torque members correlative with the load applied to the platform, and weight indicating means connected to the first and second torque members for sensing the turning moments applied thereto.

2. A platform type weighing scale according to claim 1 including hook portions formed integrally with the free ends of said base suspension members and said platform suspension members for attaching the base and platform respectively.

3. In a platform type weighing scale including a base and a scale platform, a unitary weigh frame having an elongated bendable load sensor beam and first and second rigid members rigidly attached to opposite ends of the sensor beam and each defining a pair of arm portions extending laterally from opposite sides of the sensor beam, four frame suspension means mounted on said base at the four corners of a generally rectangular pattern and each engaging a respective one of said arm portions for supporting said weigh frame on the base, four platform suspension means mounted on said platform at the four corners of a generally rectangular pattern and each engaging a respective one of said arm portions for supporting the platform on the weigh frame, the platform suspension means and frame suspension means respectively defining platform and frame pivot supports offset from each other in a direction generally paralleling the length of said sensor beam to apply a bending moment to the sensor beam correlative with the sum of the loads applied to the weigh frame at the four platform suspension means, and electrical transducer means for sensing bending of the sensor beam as an indication of the weight applied to said scale platform, the frame suspension means and platform suspension means associated with each arm portion including a hub member nonrotatably attached to the arm portion and having first and second flexible bands formed integrally therewith at spaced locations therearound, means for attaching the free ends of said first bands to the base to suspend the weigh frame from the base and means for attaching the free ends of the second bands to the platform to suspend the platform from the weigh frame.

4. A platform type scale according to claim 3 wherein said attaching means includes hook portions formed integrally with the free ends of said bands.

5. A platform type scale according to claim 3 wherein said hub means each include first and second arcuate surfaces concentric with an axis perpendicular to the sensor beam, said first and second flexible bands respectively extending tangent to said first and second arcuate surfaces.

6. A platform type scale according to claim 3 wherein said hub member and flexible bands are each formed of a resilient plastic material.

7. In a platform type weighing scale including a base and a scale platform, a unitary weigh frame having first and second relatively parallel torque members and an elongated bendable load sensor beam extending between and rigidly attached to said first and second torque members, a first pair of flexible base suspension members attached to opposite end portions of said first torque member and to said base to pivotally suspend the first torque member on the base, a second pair of flexible base suspension members attached to opposite end portions of said second torque member and to said base to pivotally support the second torque member on the base, a first pair of flexible platform suspension members attached to said platform and to opposite end portions of said first torque member, a second pair of flexible platform suspension members attached to said platform and to opposite end portions of said second torque member, said first and second platform suspension members pivotally supporting the platform on the first and second torque members at locations horizontally offset from the respective first and second base suspension members in directions generally paralleling the sensor beam and equally spaced from a point medially between the ends of the sensing beam, and electrical strain gauge means mounted on the sensor beam for sensing the sum of the bending moments produced in the sensor beam by the first and second torque members, first and second pairs of hub members respectively nonrotatably attached to the ends of the first and second torque members, said hub members each having one of said flexible base suspension members and one of said flexible platform suspension members formed integrally therewith at spaced locations therearound.

8. A platform type weighing scale according to claim 7 including hook portions formed integrally with the free ends of said base suspension members and said platform suspension members for attaching the base and platform respectively.

* * * * *